(12) United States Patent
Kitaura et al.

(10) Patent No.: US 8,505,896 B2
(45) Date of Patent: Aug. 13, 2013

(54) OBJECTING POSITIONING/FIXING DEVICE

(75) Inventors: Ichiro Kitaura, Hyogo (JP); Takayuki Munechika, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 13/643,434

(22) PCT Filed: May 17, 2011

(86) PCT No.: PCT/JP2011/061314
§ 371 (c)(1),
(2), (4) Date: Oct. 25, 2012

(87) PCT Pub. No.: WO2011/152203
PCT Pub. Date: Dec. 8, 2011

(65) Prior Publication Data
US 2013/0043634 A1 Feb. 21, 2013

(30) Foreign Application Priority Data
Jun. 3, 2010 (JP) .................................. 2010-127534

(51) Int. Cl.
*B23Q 3/00* (2006.01)
(52) U.S. Cl.
USPC ........................................ 269/309; 269/900
(58) Field of Classification Search
USPC ........................................ 269/309, 310, 900
See application file for complete search history.

(56) References Cited

U.S. PATENT DOCUMENTS

| 4,445,675 | A | * | 5/1984 | Kitaura | 269/20 |
|---|---|---|---|---|---|
| 6,527,266 | B1 | | 3/2003 | Yonezawa et al. | |
| 6,955,347 | B2 | * | 10/2005 | Kawakami et al. | 269/309 |
| 7,021,615 | B2 | * | 4/2006 | Kuroda | 269/309 |
| 7,819,392 | B2 | * | 10/2010 | Kuroda et al. | 269/309 |
| 8,087,651 | B2 | * | 1/2012 | Dahlquist | 269/309 |
| 2003/0071407 | A1 | | 4/2003 | Haruna | |
| 2004/0113346 | A1 | | 6/2004 | Kawakami et al. | |
| 2008/0061486 | A1 | * | 3/2008 | Kuroda et al. | 269/48.1 |
| 2010/0308524 | A1 | * | 12/2010 | Kitaura et al. | 269/309 |
| 2013/0043634 | A1 | * | 2/2013 | Kitaura et al. | 269/309 |

FOREIGN PATENT DOCUMENTS

| JP | 2001-038564 | 2/2001 |
|---|---|---|
| JP | 2003-039264 | 2/2003 |
| JP | 2003-181730 | 7/2003 |
| JP | 2005-034949 | 2/2005 |
| JP | 2005-074590 | 3/2005 |
| WO | WO-2005/110671 | 11/2005 |
| WO | WO-2007/074737 | 7/2007 |

* cited by examiner

Primary Examiner — Lee D. Wilson
Assistant Examiner — Jamal Daniel
(74) Attorney, Agent, or Firm — Jordan and Hamburg LLP

(57) ABSTRACT

An object positioning/fixing device is capable of generating a clamping force by clamp bolts capable of being fastened manually and realizes high operability of the clamp bolts. A simple clamp mechanism comprises the clamp bolts as major components. The object positioning/fixing device has a cooperative assembly of the positioning mechanism and the clamp bolts.

6 Claims, 13 Drawing Sheets

OBJECTING POSITIONING/FIXING DEVICE

BACKGROUND OF THE INVENTION

The present invention relates to an object positioning/fixing device which vertically and horizontally positions and fixes a target object on a base member, and particularly relates to a device fixing the target object by manually fastening multiple clamp bolts.

Heretofore, various work pallets (corresponding to the target object) for fixing the work supplied for mechaning and the work pallet positioning/fixing devices which positions and fixes the work pallets on the base members have been put into practical use.

For example, in the work pallet positioning/fixing device disclosed in Patent Document 1, on the base member provided are two sets of tapered sleeve type positioning mechanisms and four sets of ball lock type clamp mechanisms; and on the work pallet provided are four sets of ring members for positioning and clamping corresponding to above positioning mechanisms and clamp mechanisms, and the work pallet is horizontally and vertically positioned and clamped.

The clamp mechanism is driven for clamping by a laminated plate spring assembly, and driven for unclamping by the hydraulic force of the hydraulic cylinder. In the positioning/fixing device, the work pallet is positioned horizontally and vertically by a reference side positioning mechanism, and is regulated so as not to rotate around the axial center of the reference side positioning mechanism in a horizontal plane, by a positioning mechanism in diagonal relation to the reference side positioning mechanism.

On the other hand, in the work pallet positioning/fixing device disclosed in Patent Document 2, on the base member provided is; four sets of positioning mechanisms and ball lock type clamp mechanisms; and on the work pallet provided are four sets of ring members used for positioning and clamping corresponding to the four sets of positioning mechanisms and clamp mechanisms, with the work pallet being positioned in the horizontal and vertical directions and clamped.

The clamp mechanism is composed so as to be driven for clamping by the laminated plate spring assembly, and driven for unclamping by the hydraulic force of the hydraulic cylinder.

In each positioning mechanism, a tubular shaft having an annular tapered surface on the outer peripheral surface is provided on the base member. The ring member of the work pallet is provided with an annular engagement portion elastically deformable so as to increase its external diameter, the work pallet is mounted on the base member from above, the annular engagement portion of the ring member is engaged onto the tubular shaft, and the work pallet is horizontally positioned by elastically deforming the annular engagement portion so as to increase its external diameter to engage tightly with the annular tapered surface of the tubular shaft, by the clamping force of the clamp mechanism.

Patent Document #1: Japanese Laid-open Patent Publication No, 2001-38564;
Patent Document #2: Japanese Laid-open Patent Publication No, 2003-39264;

SUMMARY OF THE INVENTION

With devices of Patent Documents #1, #2, the actuator of the clamp mechanism applies a hydraulic cylinder provided therein with a laminated plate spring assembly. However, since the hydraulic cylinder becomes large, and its construction is also complex, the manufacturing cost of the pallet positioning/fixing device becomes extremely high. Therefore, in lieu of the actuator of clamp mechanism, consideration is also given to the adoption of the clamp bolts which can be manually fastened. However, with the conventional work pallet, the work is attached on the upper surface of the pallet, and in order to prevent the invasion of chips and the like, the clamp bolts should be arranged at under side of the pallet. In case of providing the clamp bolts on the base member in this manner, the construction of the clamp mechanism becomes complex, and the operability in fastening or releasing the clamp bolts deteriorates. Furthermore, such a composition which joins the conventional positioning mechanism with the clamp bolts in a cooperative manner has not yet been proposed, or realized.

The objective of the present invention is to provide an object positioning/fixing device capable of generating the clamping force by the clamp bolts capable of being fastened manually; and to provide an object positioning/fixing device which realizes high operability of the clamp bolts, and a simple clamp mechanism comprising the clamp bolts as major components, and to provide an object positioning/fixing device having a cooperative assembly of the positioning mechanism and the clamp bolts.

The present invention presents an object positioning/fixing device which accomplishes horizontal and vertical positioning and fixing of a target object on a base member, wherein: the base member comprises, a first reference member for horizontal positioning, a second reference member for regulating rotation around the first reference member in a horizontal plane and disposed in a position isolated from the first reference member, and a reference seat for vertical positioning, and wherein; the first and second reference members respectively comprise, a flange portion, and an engagement convex portion protruding upwardly from a center of the flange portion, the engagement convex portions of the first and second reference members respectively comprising a first and second tapered engagement surface whose diameter decreases upwardly, and wherein; the target object comprises multiple annular engagement members having respectively an annular engagement portion capable of deforming elastically so as to increase respective outer diameter and capable of respectively engaging tightly with the first and second tapered engagement surfaces of the first and second reference members, and wherein; the object positioning/fixing device is constituted so that, by mounting the target object on the reference seat of the base member, fastening multiple clamp bolts to multiple bolt holes on the base member side from multiple bolt pass through holes formed in the target object, and pressing the target object to the reference seat, the target object is positioned and fixed through an elastic deformation of the annular engagement portions.

According to the present invention, in order to fix the target object to the base member by means of multiple clamp bolts screwed into the multiple bolt holes on the base member side from multiple bolt pass through holes formed in the target object, thus the construction for clamping the target object is simplified with reducing the manufacturing cost of the target object positioning/fixing device. Since an operation (fastening/releasing; operation) for the clamp bolts from above of the target object is possible, the operability of the clamp bolts can he improved.

In addition to the above composition of the present invention, the following composition may also be adopted.

(1) The bolt holes on the base member side are respectively formed in center portions of the first and second reference members, the bolt pass through holes formed in the target object are respectively formed in portions of the target object so as to correspond to the bolt holes, the target object is mounted on the reference seat of the base member, and the clamp bolts are respectively fastened to the bolt holes formed in the first and second reference members from the bolt pass through holes.

According to this device, when engaging respectively the annular engagement members with the first and second reference members, since it is possible to directly fasten the clamp bolts to the first and second reference members, the clamping force efficiently acts on the center of the first and second reference members, enabling an increase in positioning precision.

In addition, since the clamp bolts with the first and second reference members cooperatively assembled, the first and second reference members can be utilized effectively for clamping.

(2) Multiple vertical center bolt pass-through holes are respectively formed in a center portion of the first and second reference members, the bolt holes on the base member side are respectively formed in portions of the base member corresponding to the center bolt pass through holes, the bolt pass through holes formed in the target object are respectively formed in portions of the target object corresponding to the center bolt pass through holes, and a pallet is mounted on the reference seat portion of the base member, and said clamp bolts are respectively fastened to said bolt holes of the base member through said center bolt pass through holes of the first and second reference members from said bolt pass-through holes.

According to this device, since the center bolt through holes are formed in the center of the first and second reference members, the clamp bolts are inserted though the bolt through holes of the target object and the center bolt through holes and screwed to the bolt holes on the base member side, the clamping force can effectively exerted on the center of the first and second reference members, which is advantageous in increasing positioning precision.

(3) in plane view, the second reference member comprises a pair of tapered engagement surfaces facing each other in a perpendicular direction with a center line connecting both axial centers of the first and second reference members. According to this device, the target object can be reliably regulated so as not to rotate around the axial center of the first reference member.

(4) On an upper surface of the base member formed is a reference seat for seating a lower surface of the target object. According to this device, since on the upper surface of the base member the reference seat is formed for seating the lower surface of the target object, the base member can be utilized for forming the reference seat, thereby there is no gap between the base member and the target object, making it possible to prevent the invasion of chips.

(5) The flange portions of the first and second reference members are fixed respectively by multiple fitting bolts in a state housed in multiple fitting holes formed in the base member, and the annular engagement members are press fit and fixed respectively into an indentation formed in the target object from a lower surface thereof.

According to this device, the flanges portion of the first and second reference members are fixed by multiple fitting bolts with housed in holes formed in the base member. Since the annular engagement member is press fit into an indentation formed in the target object, the large part of the upper surface of the base member is flattened, and the lower surface of the target object can be made flat.

DESCRIPTION OF THE PREFERRED EMBODIMENTS

An explanation will be made on the best mode for implementing the present invention based on the embodiments. Furthermore, in the following embodiments, "horizontal positioning" means to determine the position in the horizontal direction; and "vertical positioning" means to determine the position in the vertical direction.

Embodiment 1

Figure 1:
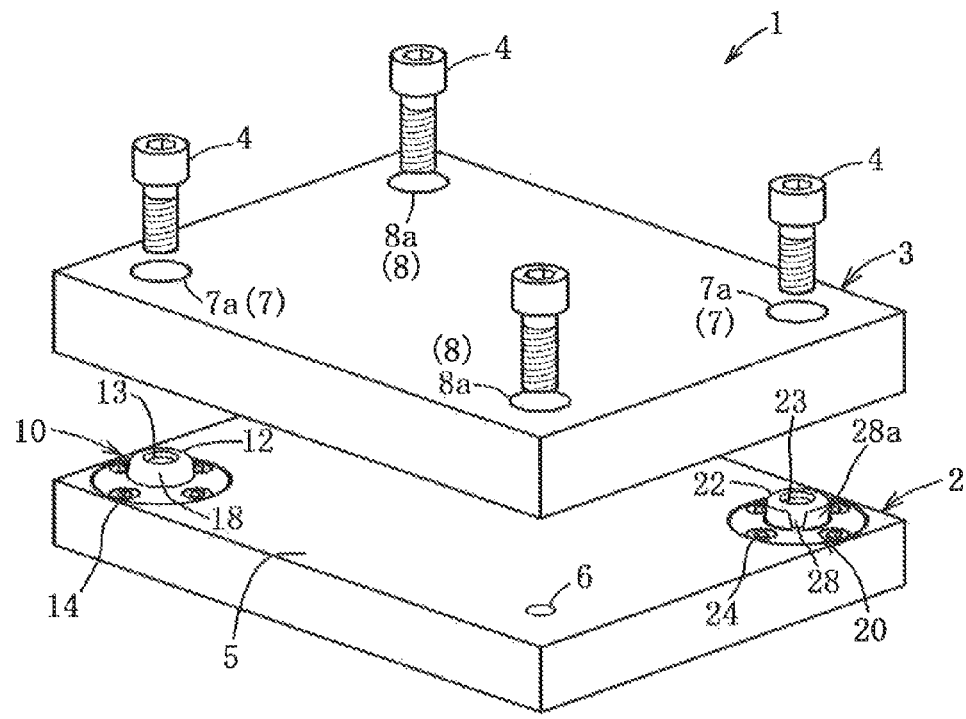
FIG. 1 is an exploded perspective view of the pallet positioning/fixing device of the first embodiment.

As shown in FIG. 1, the pallet positioning/fixing device 1 (corresponding to the "object positioning/fixing device"; hereafter referred to as the "positioning/fixing device") of Embodiment 1 positions the pallet 3 (corresponding to the "target object"; hereafter referred to as the "work pallet") for holding one or multiple works to be supplied for mechaning on the base member 2 in the horizontal and vertical direction, and fixes the work pallet by means of the clamp bolts.

Base member 2 is set in a fixed state on a machine tool table or the like. On the work pallet 3 fixed are one or multiple works (not shown) by means of the clamping device or multiple bolts (not shown), the work pallet 3 is transported onto the base member 2, and after being horizontally and vertically positioned and fixed, machining is executed to one or multiple works on the work pallet 3.

The positioning/fixing device 1 comprises; the base member 2, the work pallet 3, and four clamp bolts. The base member 2 and the work pallet 3 are respectively composed of a rectangular thick steel flat plate member. Nearly the entire area of the upper surface of the base member 2 is formed to be the horizontal reference seat 5 (reference surface) for vertically positioning the work pallet 3, and the base member 2 can mount the work pallet 3 with seating the lower surface thereof.

As shown in FIG. 1, FIG. 2, and FIGS. 4-8, the base member 2 comprises; a first reference member 10 for horizontal positioning, a second. reference member 20 disposed in a position isolated from the first reference member 10, for regulating rotation around the first reference member 10 in a horizontal plane, the reference seat 5, and a pair of bolt holes 6.

The first and second reference members 10, 20 are disposed in the proximity of a pair of corners in the diagonal relationship of the base member 2. The pair of bolt holes 6 are disposed in the proximity of a pair of corners (a pair of corners different from above described pair of corners) in the diagonal relationship of the base member 2.

The first reference member 10 comprises; a disciform flange portion 11, an engagement convex portion 12 protruding upward from the center of the flange portion 11, a vertical bolt hole 13 formed in the center of the first. reference member 10, four vertical fitting bolts 14 which fix the flange portion 11 to the base member 2 and four bolt holes 15. The four bolt holes 15 are disposed in four positions dividing equally the circumference. The first tapered engagement surface 18 is formed so as to decrease diameter upwardly on the outer circumference of the engagement convex portion 12 of the first reference member 10. However, the first tapered engagement surface 18 may also be composed of multiple tapered engagement surfaces intermittently formed in the peripheral direction.

In a state in which the flange portion 11 of the first reference member 10 is housed in the fitting hole 16 formed in the base member 2, by respectively inserting four fitting bolts 14 into the bolt holes 15, and screwing them into the bolt holes 17 in the base member 2, the flange portion 11 is fixed. The upper surface of the flange portion 11 is made to be a horizontal surface slightly lower than the reference seat 5 (see FIG. 4).

The upper half of each bolt hole 15 is formed to be a bolt head housing hole 15a, and the lower half of each bolt hole 15 is formed to be a bolt pass through hole. The wail thickness of the wall between the peripheral surfaces of the flange portion 11 and the bolt head housing hole 15a is extremely small.

As shown in FIG. 1, FIG. 2, and FIG. 4-FIG. 8, the second reference member 20 comprises; a disciform flange portion 21, an engagement convex portion 22 protruding upwardly from the center of the flange portion 21, the vertical bolt hole 23 formed in the center of the second reference member 20, and four vertical fitting bolts 24 and four bolt holes 25 which fix the flange portion 21 to the base member 2. The four bolt holes 25 are arranged same as the four bolt holes 15.

In a state in which the flange portion 21 of the first reference member 20 is housed in the fitting hole 26 formed in the base member 2, by respectively inserting four fitting bolts 24 into the bolt holes 25, and screwing them into the bolt holes 27 in the base member 2, the flange portion 21 is fixed. The upper surface of the flange portion 21 is made to he a horizontal surface slightly lower than the reference seat 5 (see FIG. 4).

The upper half of each bolt hole 25 is formed to be a bolt head housing hole 25a, and the lower half of each bolt hole 25 is formed to be a bolt pass through hole. The wall thickness of the wall between the peripheral surfaces of the flange portion 21 and the bolt head housing hole 25a is extremely small.

On the outer circumference of the engagement convex portion 22, two second tapered engagement surfaces 28 whose diameter decreases upwardly, are formed in two positions dividing equally the circumference. In plane view, the two second tapered engagement surfaces 28 face each other in the perpendicular direction with the center line L (see FIG. 2) connecting both axial centers of the first and second reference members 10, 20. Since the peripheral length (arc length) of each second engagement surface 28 has approximately a ⅛th to ¹⁄₁₀th of circumference, elastic deformation is promoted when there is elastic deformation of the annular engagement 41 explained hereafter, and thus tight contact can be obtained between the second tapered engagement surface and the annular engagement portion 41.

As shown in FIG. 1, FIG. 3, FIG. 7 and FIG. 8, the work pallet 3 comprises; a first annular engagement member 30 which engages with the first reference member 10, a second annular engagement member 40 which engages with the second reference member 20, two bolt pass through holes 7 corresponding to the bolt holes 13, 23 of the first and second reference members 10, 20, and two bolt pass through holes 8 which correspond to the two bolt holes 6.

The first and second annular engagement members 30 and 40 are pressed and fixed by press fitting into the circular fitting indentation 9 formed in the work pallet 3. Bolt pass through holes 7, 8 are formed parallel to the axial center of the first and second reference members 10, 20 so as to penetrate the pallet 3 in the plate thickness direction. In the upper portions of the bolt pass through holes 7, 8 are formed to be head housing holes 7a. 8a capable of housing the heads of the clamp bolts 4. Since the upper surface of the heads of the clamp bolts 4 is set in a position slightly lower than the upper surface of the pallet 3, it is advantageous to set the work on the surface of the pallet 3. Furthermore, the first annular engagement member 30 and the second annular engagement member 40 have the same construction.

As shown in FIG. 3, FIG. 4, FIG. 7 and FIG. 8, the first annular engagement member 30 is provided with an annular engagement portion 31 which, when it is engaged with the outer periphery of the engagement convex portion 12 of the first reference member 10 and is fastened by the fastening force of the bolt 4, is capable of deforming elastically so as to increase its diameter, and is capable of engaging tightly with the first tapered engagement surface 18 of the engagement convex portion 12.

Figure 3:
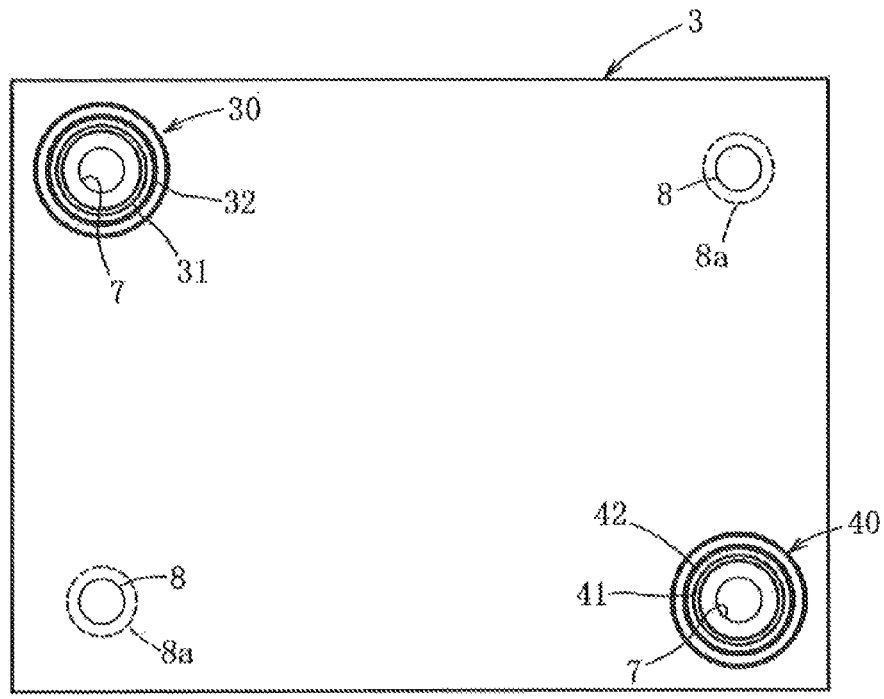
FIG. 3 is a bottom view of the pallet.
Figure 4:
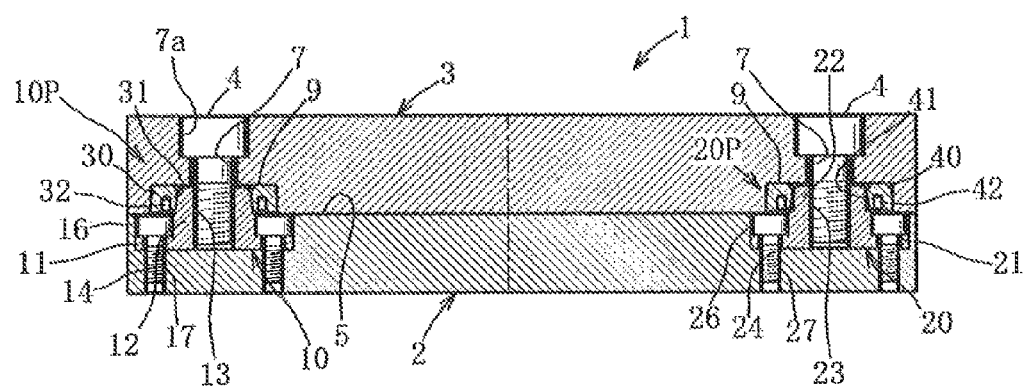
FIG. 4 is a vertical cross-sectional diagram of the pallet positioning/fixing device taken along the line IV-IV of FIG. 2.
Figure 7:
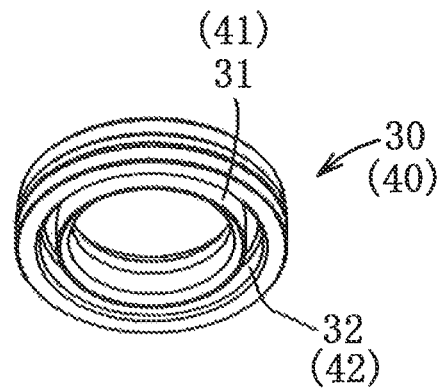
FIG. 7 is a perspective view of an annular engagement member.
Figure 8:
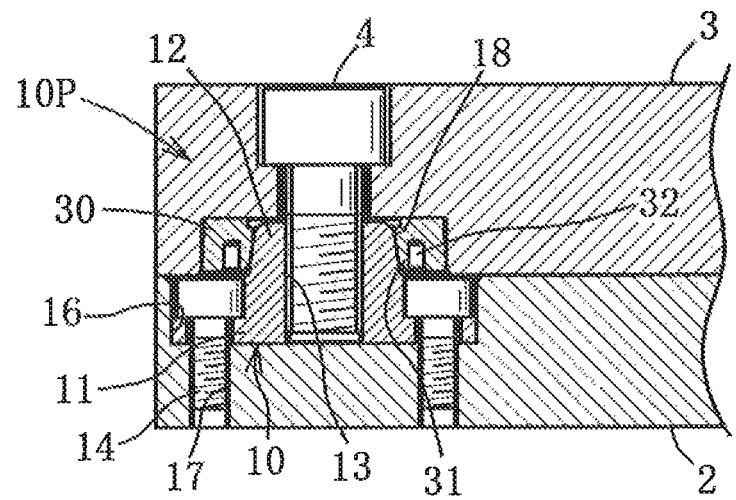
FIG. 8 is a cross-sectional diagram of the essential portion the first reference member and the annular engagement member.

As shown in FIG. 3, FIG. 4, and FIG. 7, the second annular engagement member 40 is provided with an annular engagement portion 41 which, when it is engaged with the outer periphery of the engagement convex portion 22 of the second reference member 20 and is fastened by the fastening force of the bolt 4, is capable of deforming elastically so as to increase its diameter and is capable of engaging tightly with the second tapered engagement surface 28 of the engagement convex portion 22.

The first and second annular engagement members 30, 40 are fixed by press fitting into an fitting indentation 9 formed in the work pallet 3 from its lower surface. The lower surface of the first and second annular engagement members 30, 40 are horizontal surfaces slightly higher than the lower surface of the work pallet 3.

In the first and second annular engagement members 30, 40, annular grooves 32, 42 having opened lower ends are formed on the outer periphery of the annular engagement portions 31, 41, and the annular engagement portions 31, 41 are constituted to be annular walls which have an appropriate horizontal rigidity, and are composed as annular walls deformable elastically in the direction of increasing diameter through annular grooves 32, 42. On the outer surface portions between the two tapered engagement surfaces 28 of the second reference member 20 formed are a pair of shallow grooves 28a of arc shape in plan view, and the annular engagement portion 41 does not contact with the wall surface of the shallow grooves 28a.

Furthermore, the forms of annular grooves 32, 42 are not limited it to above form, these grooves 32, 42 may also be composed so as to form an annular indentation having opened lower ends between the first and second annular engagement members 30, 40 and the wall of work pallet 3. In this instance, the annular engagement portions 31, 41 may comprise appropriately rigid annular walls with moderate horizontal rigidity, which are capable of deforming elastically so as to increase their diameters via the annular indentation.

The work pallet 3 is mounted on the reference seat 5 of the base member 2, and by means of respectively fastening the clamp bolts 4 to the bolt holes 13, 23 of the first and second reference members 10, 20 from the pair of bolt pass through holes 7, the work pallet 3 is pressed onto to the reference seat 5. Thereby, the work pallet 3 is vertically positioned., along with horizontally positioning with a high precision by means of making the annular engagement portions 31, 41 engage with the first and second tapered engagement surfaces 18, 28 through the elastic deformation toward diameter expansion of the annular engagement portions 31, 41.

Furthermore, in an ancillary manner, two clamp bolts 4 are respectively fastened to bolt holes 6 of the base member 2 from the bolt pass through holes 8, and by pressing the work pallet 3 against the reference seat 5, the proximate portions of the pair of corners separated from the first and second reference members 10, 20 in the work pallets 3 are fixed to the base member 2. Furthermore, the first positioning fixing mechanism 10P for horizontally positioning and fixing is composed of a first reference member 10, an annular engagement member 30, and a clamp bolt 4 and the second positioning/fixing mechanism 20P for horizontally positioning and fixing is composed of a second reference member 20, an annular engagement member 40, and a clamp bolt 4.

Next, an explanation will be made concerning the operation and advantages of the positioning/fixing device 1. The base member 2 is pre-set and fixed on the machine tool table. In the work preparation stage, in a state in which one or multiple works are fixed on the work pallet 3, then the work pallet 3 is transported above the base member 2, and mounted onto the reference seat 5 of the upper surface of the base member 2.

At this time, the annular engagement portions 31, 41 of the annular engagement members 30, 40 of the work pallet 3 are lightly engaged with the engagement convex portions 12, 22 of the first and second reference members 10, 20. In this state, the two clamp bolts 4 are inserted from the bolt pass through holes 7, and by screwing them into the bolt holes 13, 23 of the engagement convex portions 12, 22 of the first and second reference members 10, 20, the annular engagement portions 31, 41 elastically deform so as to increase external diameter, and are tightly engaged with and fixed to the first and second tapered engagement surfaces 18, 28. Next, two clamp bolts 4 are inserted from the bolt pass through holes 8, and by screwing them into the bolt holes 6 of the base member 2, the proximate portions of the pair of corners of the work pallet 3 are fixed to the base member 2.

The annular engagement portion 31 of the annular engagement member 30 of the work pallet 3 is horizontally positioned, with contacting with the first tapered engagement surface 18 of the engagement convex portion 12 of the first reference member 10, and the annular engagement portion 41 of the annular engagement member 40 is regulated so as not to rotate in the horizontal plane, around the axial center of the first reference member 10, with contacting tightly with the pair of the second tapered engagement surfaces 28 of the engagement convex portion 22.

In this manner, the work pallet 3 can be horizontally and vertically positioned and fixed relative to the base member 2. Furthermore, even in the case where, due to manufacturing errors of the work pallet 3 relative to the base member 2, the distance between the axial centers of the annular engagement members 30, 40 and the distance between the axial centers of the first and second reference members 10, 20 are not equal, since there is an allowance for positional slippage in the direction of the center line L of the annular engagement member 40, it is possible to position and fix the work pallet 3. Furthermore, after fastening the bolt 4 in the bolt hole 13, the bolt 4 is desirably fastened to the bolt hole 23.

In the pallet positioning/fixing device 1, since the four clamp bolts 4 are screwed into the bolt holes 13, 23, 6, 6, and the work pallet 3 is fixed by their clamping force, there is no need to provide a hydraulic cylinder for clamping and unclamping. Since the clamping mechanism has a simple construction, a great reduction in the manufacturing cost can be achieved. Furthermore, since the clamping force can be applied from the clamp bolt 4 on the center of the first and second reference members 10, 20, positioning precision can be increased. Furthermore, since the clamp bolt 4 can be inserted and operated from upper side of the work pallet 3, the mechanism for clamping become simple in comparison with a composition which operates the clamp bolt 4 from bottom side of the work pallet 3, and operability in the operation (fastening/releasing) of the clamp bolt 4 is improved.

Since the entire area of the upper surface of the base member 2 is formed to be the reference seat 5 (reference surface), and since there is no gap between the upper surface of the base member 2 and the lower surface of the work pallet 3, there is no invasion of chips or the like. Since on the upper surface of the base member 2 the reference seat 5 is formed for seating the lower surface of the work pallet 3, the base member 2 can be utilized to form the reference seat 5.

The thickness of the annular engagement portions 31, 41 of the annular engagement members 30, 40 is set to an appropriate size, and is composed so as to elastically deform slightly toward diameter expansion by the fastening force of the clamp bolt 4. Thereby, a relatively weak clamping force of clamp bolt 4 can deform elastically the engagement portion 31, 41, the precision of horizontal positioning can be assured., enabling the tight contact of the annular engagement 31, 41 to the first and second tapered engagement surfaces 18, 28.

The flanges portions 11, 21 of the first and second reference members 10, 20 are housed and fixed in the fitting hole 16 formed in the base member 2 and since the annular engagement members 30, 40 are press fit and fixed in the indentation formed in the work pallet 3, with the exception of the engagement convex portions 12, 22, the large parts of the upper surface of the base member 2 can be flatly formed, and the lower surface of the work pallet 3 can be flatly formed.

Two bolt holes 6 are formed vertically in the base member 2, and since two bolt insertion holes 8 corresponding to the two bolt holes 6 are formed in the work pallet 3, the respective clamp bolts 4 are inserted into the bolt insertion holes 8, the number of fixed points of the work pallet 3 can be increased by screwing them into the bolt holes 6.

Furthermore, the bolt holes 13, 23 are formed in the center of the first and second reference members 10, 20, and forming the bolt pass through holes 7 in the part of the work pallet 3 corresponding to the bolt holes 13, 23, the work pallet 3 is mounted on the reference seat 5 of the base member 2, and the clamp bolts 4 are respectively fastened to the bolt holes 13, 23 of the first and second reference members 10 and 20 from the bolt pass through holes 7. Furthermore, at the time of engaging the annular engagement members 30, 40 with the first and second reference members 10, 20, since the clamp bolts 4 can be directly fastened to the first and second reference members 10, 20, the clamping force effectively acts on the center part of the first and second reference members 10, 20, and the annular engagement portions 31, 41 engage forcibly and tightly with the first and second tapered engagement surfaces 18, 28, enabling an increase in positioning accuracy. In addition, the first and second reference members 10, 20 can be effectively used for the generation of clamping force.

Figure 13:
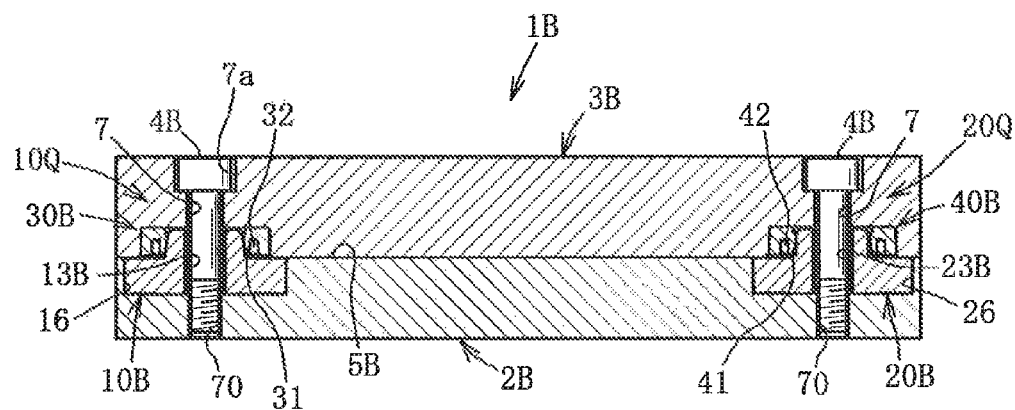
FIG. 13 is a vertical cross-sectional diagram of the pallet positioning/fixing device.

Here, as same with the construction shown in FIG. 13, explained hereafter, the bolt pass through holes (center bolt pass through holes) may be formed in lieu of the bolt holes 13, 23 of the first and second reference members 10, 20, and bolt holes may he formed in the part of the base member 2 so as to correspond to the center bolt pass through holes. The clamp bolts 4 may also be screwed into the bolt holes of the base member 2 after passing through the center bolt pass through holes of the first and second reference members 10, 20.

Furthermore, the work pallet 3 of the present embodiment has been explained as an example of the pallet for attaching the work. However, the pallet is not limited to the work pallet, and application may also be made for various pallets for attaching various devices, such as tools or molds.

Embodiment 2

Figure 9:
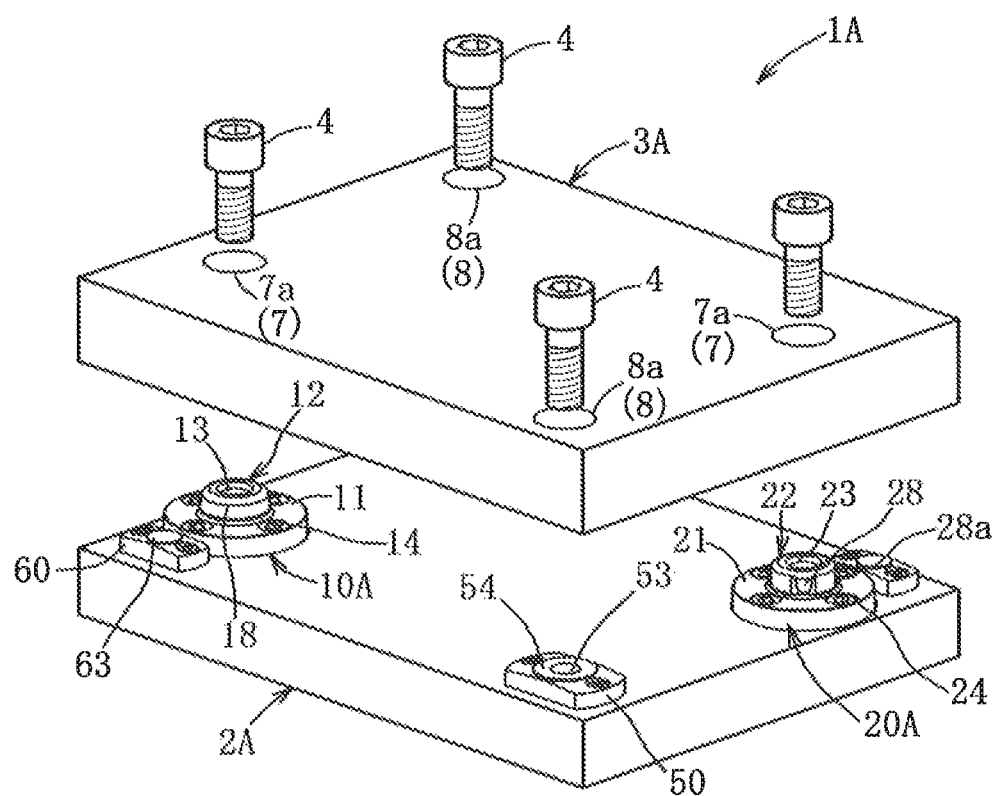
FIG. 9 is an exploded perspective view of the pallet positioning/fixing device of the second embodiment.
Figure 10:
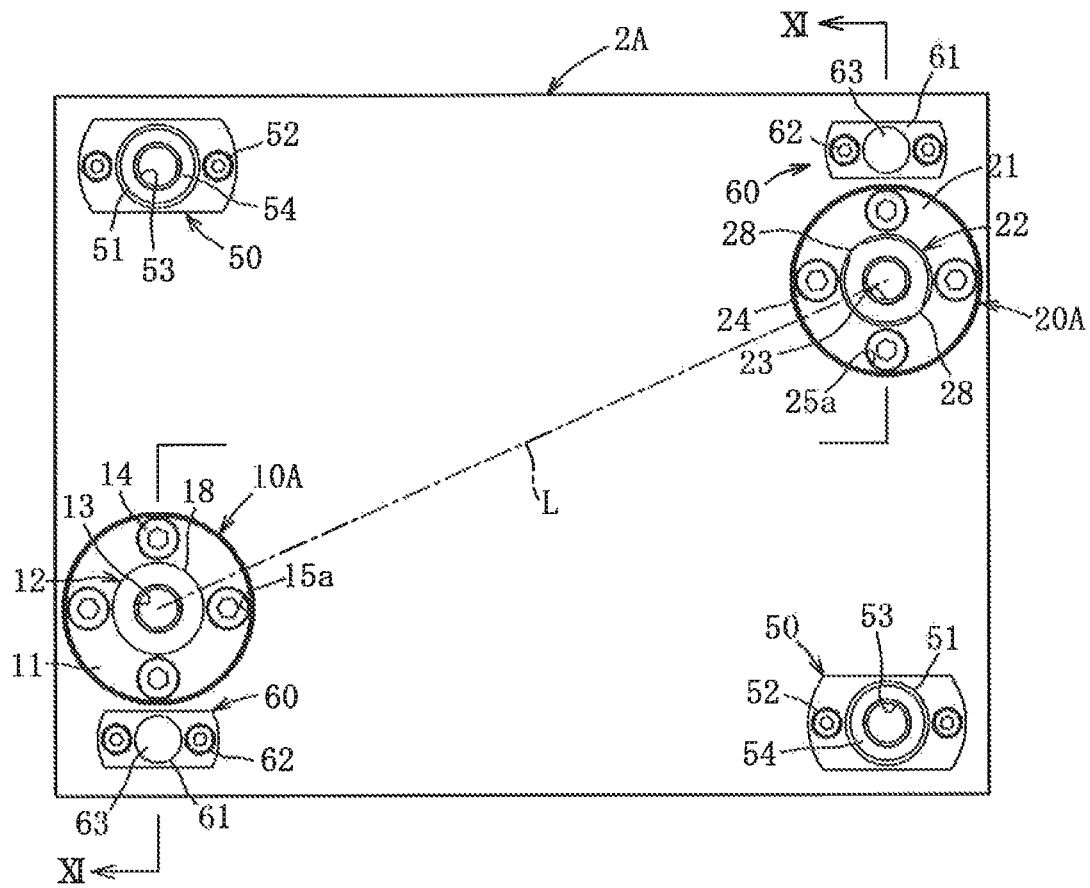
FIG. 10 is a plan view of the base member.
Figure 11:
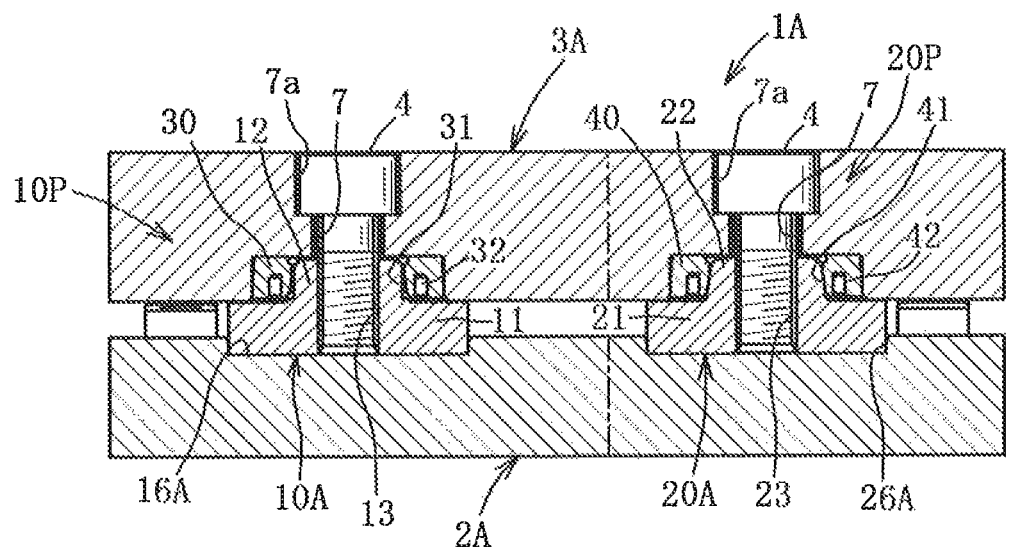
FIG. 11 is a vertical cross-sectional diagram of the pallet positioning/fixing device taken along the line XI-XI of FIG. 10.

Next, an explanation will be made concerning the pallet positioning/fixing device 1A (corresponding to the "object positioning/fixing device"; hereafter referred to as the "positioning/fixing device") of embodiment 2, based on FIG. 9-FIG. 11. However, the positioning/fixing device 1A, as same with the positioning/fixing device of embodiment 1, is a device which positions and fixes the work pallet (corresponding to the "target object") for holding or attaching the work to be supplied firming by the machine tool. The same numerals are appended to the same elements as in embodiment 1, their explanation will he omitted, and an explanation will be made for only those elements having a different composition.

The positioning/fixing device 1A comprises; the base member 2A, the work pallet 3A, four clamp bolts 4, two bolt hole formation members 50 attached to the base member 2, and two seat forming members 30.

Base member 2A is provided with first and second reference members 10A, 20A. With first and second reference members 10A, 20A, only the lower end portion of the flange portions 11, 21 are pressed into the holes 16A in the base member 2A, and the parts of other than the lower end portions protrude upward than the upper surface of the base member 2A. The first and second reference members 10A, 20A are respectively the same as the first and second reference members 10, 20, and the work pallet 3A is the same as the work pallet 3.

The bolt hole forming member 50 forms the reference seat 54 and the bolt hole 53. A pair of bolt hole forming member 50 are disposed in a pair of corners of base member 2A opposing each other in diagonal relationship. The bolt hole forming member 50 is formed in a substantially oval-shape, and the seat convex part 51 protruding upward is formed in the center of the bolt hole forming member 50, and this member 50 is fixed to the upper surface of the base member 2A by a pair of bolts 52. In the center of the seat convex part 51 formed is a vertical bolt hole 53 for screwing the clamp bolt 4, and on the upper end surface of the seat convex part 51 formed, is an annular reference seat 54 which encompasses the bolt hole 53. The bolt hole 53 is disposed in a position corresponding to the bolt pass through hole 8 of the work pallet 3A. The reference seat 54 is provided in the position slightly higher than the upper surface of flange portions 11, 21 of the first and second reference members 10A, 20A.

The seat forming member 60 forms the reference seat 63. A pair of the seat forming members 60 is disposed on a pair of corners (a pair of corners which differs from the pair of corners provided with the bolt hole forming members 50) in a diagonal relationship with base member 2A. One seat forming member 60 is disposed in a position closely proximate to the first reference member 10A, and the other seat forming member 60 is disposed in a position closely proximate to the second reference member 20A.

The seat forming member 60 has an elongated shape and the seat convex part 61 protrudes in the center of the seat forming member 60, and is fixed on the upper surface of the base member 2A by a pair of bolts 62. On the upper end surface of the seat convex part 61 formed is a circular reference seat 63 positioned at the same height as that of the reference seat 54. The pair of reference seats 54 and the pair of reference seats 63 correspond to the reference seat for vertically positioning the work pallet 3A.

The pallet positioning/fixing device 1A fundamentally presents the same operation and advantages as the pallet positioning/fixing device of embodiment 1. Furthermore, since the bolt hole formation member 50 is fixed on the upper surface of the base member 2A and reference seats 54, 63 are formed on the bolt hole forming members 50 and the seat forming members 60, since there is no need to increase the plane surface precision of the upper surface of the base member 2A, production cost of the base member 2A can be reduced. Furthermore, since the entire area of the reference seats 54, 63 is small, the area of air blowing and cleaning the reference seats 54, 63 is small, and air blowing is easily accomplished.

Here, in the same manner as with the construction shown in. FIG. 13, explained hereafter, bolt through holes (center bolt through holes) may be formed in lieu of the bolt holes 13, 23 of the first and second reference members 10A, 20A. A composition may also he accomplished in which, bolt holes are formed in part of the base member 2A corresponding to the area immediately below the center bolt through holes, the clamp bolts 4 pass through the center bolt through hole of the first and second reference members 10A, 20A, following which they are screwed into the bolt holes of the base member 2.

Furthermore, the work pallet 3 of the present embodiment is explained as an example of the pallet for attaching the work. However, the pallet is not limited to the work pallet, but application may be made for various pallets for attaching various devices, such as tools or molds.

Embodiment 3

Next, an explanation will be made concerning the pallet positioning/fixing device 1B of embodiment 3 (corresponding to the "object positioning/fixing device"; hereafter referred to as the "positioning/fixing device") based on FIG. 12 and FIG. 13. The positioning/fixing device IB, is a device which positions and fixes the pallet 3B (corresponding to the "target object") to the base member 2B as the cutting blade support pedestal for holding cutting tools in machine tools such as a lathe or the like, or other tools, products or work. Also, an explanation is omitted for such elements having numerals which are the same as for the same elements as in the first embodiment, and an explanation will be made only for different compositions.

The positioning/fixing device 1B comprises; the base member 2B, the pallet 3B, and two clamp bolts 4B. The base member 2B and the pallet 3B are respectively composed with the thick steel plate member having a elongated rectangular shape. The entire area of the upper surface of the base member 2B is formed to he the horizontal reference seat 5B for vertical positioning with seating the lower surface of the pallet 3B.

Figure 12:
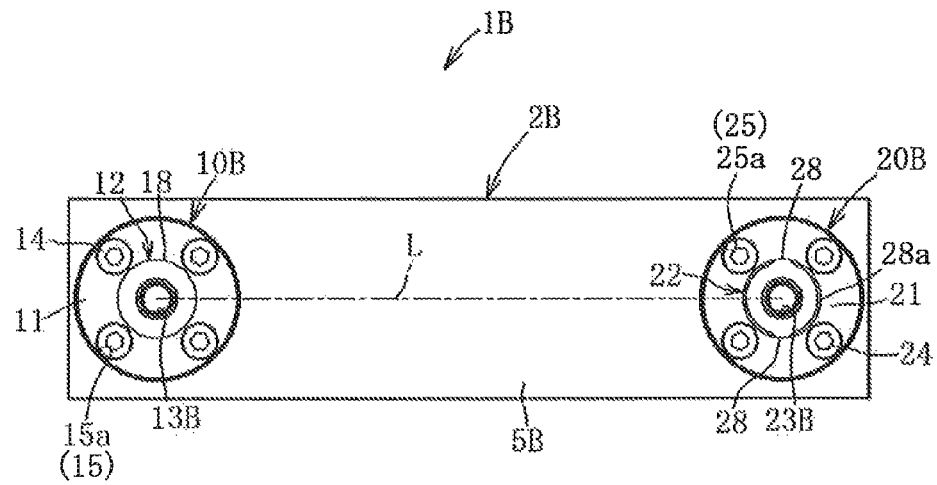
FIG. 12 is a plan view of the base member of the pallet positioning/fixing device of the third embodiment.

As shown in FIG. 12 and. FIG. 13, base member 2B comprises; a first reference member 10B, a second reference member 20B disposed in a position isolated from the first reference member 10B and for regulating rotation in the horizontal plane around the axial center of the first reference member 10B, the reference seat 5B, and a pair of bolt holes 70. The first and second reference members 10B, 20B are respectively disposed in the proximity of both ends of the base member 2B, and the pair of bolt holes 70 are formed in parts of the base member 2B corresponding to the center bolt pass through holes 13B, 23B of the first and second reference members 10B, 20B, explained hereafter. However, in the case where the base member 2B has a rectangular shape or a square shape as same with base member 2 of embodiment 1, the first and second reference members 10B, 20B are disposed to be the same as the positioning/fixing device of embodiment 1.

Since the first reference member 10B, other than having the formation of the vertical center bolt pass through holes 13B formed in the center of the first reference member 10B in lieu of the bolt hole 13B of embodiment 1, has the same composition as the first reference member 10 of embodiment 1, an explanation of other compositions is omitted. The vertical bolt hole 70 is formed in the lower wall of the base member 2B corresponding to the center of the fitting hole 16 which houses the flange portion 11 of the first reference member 10B.

Since the second reference member 20B, other than the formation of the vertical center bolt pass through hole 23B formed in the center of the second reference member 20B in lieu of the bolt hole 23 of embodiment 1, has the same composition as the second reference member 20 of embodiment 1, an explanation of other compositions is omitted. The bolt hole 70 is formed in the lower wall of the base member 2B corresponding to the center of the fitting hole 26 which houses the flange portion 21 of the second reference member 20B. Two second tapered engagement surfaces 28 on outer periphery of the engagement convex portion 22 face each other in the direction perpendicular to the center line L (see FIG. 12) connecting both axial centers of the first and second reference members 10B, 20B in the plan view.

The pallet 3B comprises; a first annular engagement member 30B which engages with the first reference member 10B, a second annular engagement member 40B which engages with the second reference member 20B, and two bolt pass through holes 7 corresponding to the first bolt pass through holes 13B, 23B of the first and second reference members 10B, 20B. Furthermore, in the upper part of the bolt pass through hole 7 is formed to be the head housing hole 7a which houses the bolt head of the clamp bolt 4B, and in a state in which the clamp bolt 4B is fastened, the upper surface of the bolt head is positioned slightly lower than the upper surface of the pallet 3B. Furthermore, the first annular engagement member 30B and second annular engagement member 40B have the same construction.

The pallet 3B is mounted on the reference seat 5B of the base member 2B, and by inserting the clamp bolts 4B into the center bolt pass through holes 13B, 23B from the bolt pass through holes 7, and respectively fastening them to bolt holes 70 of the base member 2B and pressing the pallet 3B to the reference seat 5B, the pallet 3B is positioned and fixed by contacting the annular engagement portions 31, 41 to the first and second tapered engagement surfaces 18, 28 though the, elastic deformation of the annular engagement portions 31, 41.

When the annular engagement portions 31, 41 are contacted tightly to the first and second tapered engagement surfaces 18, 28, the second annular engagement member 40B can move slightly in the lateral direction (left to right direction in FIG. 12 relative to base member 2B, through the pair of shallow grooves 28a. However, the second annular engagement member 40B can not move in the vertical direction in FIG. 12 through the pair of second tapered engagement surfaces 28. Thereby, even if there is a manufacturing error between the distance between the axial centers of the first and second reference members 10B, 20B of the base member 21B and the distance between the axial centers of the first and second annular engagement members 30B, 40B, the pallet 3B can he positioned accurately and fixed relative to the base member 2B through the first and second reference members 10B, 20B.

The pallet positioning/fixing device 1B explained above fundamentally presents the same action and advantages as the pallet positioning/fixing device 1 of embodiment 1.

Furthermore, the vertical center bolt pass through holes 13B, 23B are formed in the center of the first and second reference members 10B, 20B, multiple bolt holes 70 are formed in part of the base member 2B corresponding to the center bolt pass through holes 13B, 23B, multiple bolt pass through holes 7 are formed in part of the pallet 3B corresponding to the center bolt pass through holes 13B, 23B, after mounting the pallet 3B on the reference seat 5B of the base member 2B, by means of inserting multiple clamp bolts 4B into the center bolt pass through holes 13B, 23B from the bolt pass through holes 7, the multiple clamp bolts 4B can he respectively fastened to the bolt holes 70 of the base member 2B.

Furthermore, the first positioning and fixing mechanism 10Q which conducts horizontal positioning and fixing is constituted with a first reference member 10B, an annular engagement member 30B and a bolt 4B. The second positioning and fixing mechanism 20Q which conducts horizontal positioning and fixing is constituted with a second reference member 20B, an annular engagement member 40B and a bolt 4B.

Furthermore, the clamp bolts 4B are inserted into the center bolt pass through holes 13B, 23B of the first and second reference members 10B, 20B and directly fastened to the base member 2B. Since the pallet 3B is positioned and fixed to the base member 2B, there is no need for the first and second reference members 10B, 20B to be firmly fixed to the base member 2B, making it possible to reduce the number of multiple attachment, bolts 14, 24, and by making the fitting bolts slender and reducing the diameter of the flange portions 11, 21, it is possible to reduce the production cost.

However, as same with the first and second embodiments, a composition may also be adopted in which the bolt hole is formed in the center of the first and second reference members 10B, 20B, and the clamp bolts are screwed into these bolt holes.

Furthermore, a positioning/fixing composition may also be adopted in which a pair of annular engagement members 3DB is disposed with a specified interval A therebetween in the pallet 3B, and, on the base member 2B, three or more first reference members 10B are provided in series with keeping the specified interval A, and a pair of annular engagement members 30B on the pallet 3B are engaged with adjacent two first reference members 10B selectively. In this case, the position of the pallet 3B can be switched to multiple positions. With the pallet 3B, there are instances of composing in other than the thick plate form, such as in a cuboid shape in addition, mechanisms for attaching/removing the cutting tools and various other mechanisms, may also be included on the pallet 3B.

Embodiment 4

Next, an explanation will be made concerning the pallet positioning/fixing device 1C (corresponding to the "object positioning/fixing device"; hereafter referred to as the "positioning/fixing device") of embodiment 4, based on FIG. 14 and FIG. 15. The positioning/fixing device 1C is a device which positions and fixes the pallet 3C (corresponding to the "target object") on the base member 2C applied to the same use as pallet 3B of embodiment 3. However, the same numerals are appended to the same elements as for embodiment 1; hence their explanation is omitted, and an explanation is given for only those elements having a different composition.

The positioning fixing device 1C comprises; the base member 2C, a pallet 3C, and two clamp bolts 4C. The base member 2C and pallet 3C are respectively composed with a oblong thick plate member. The entire area of the upper surface of the base member 2C is formed to be the horizontal reference seat 5C for vertical positioning for seating the lower surface of the pallet 3C.

Figure 14:
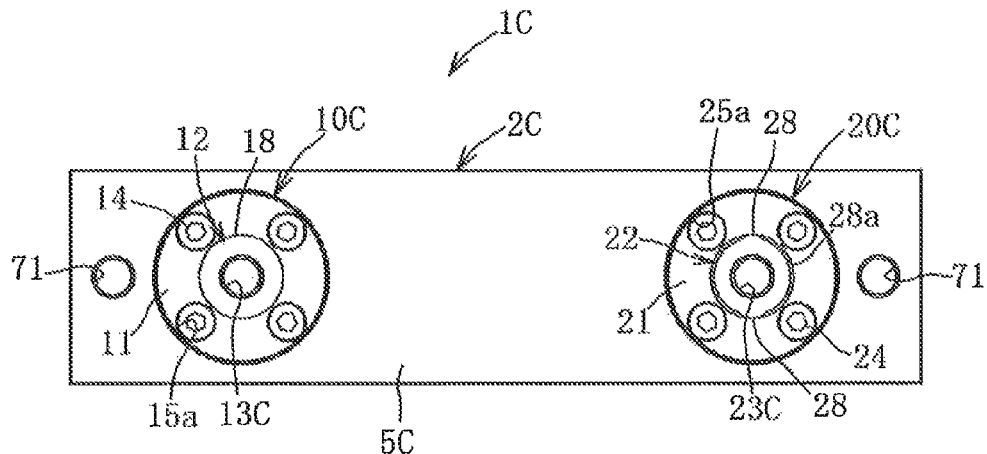
FIG. 14 is a plan view of the base member of the pallet positioning/fixing device of the fourth embodiment.
Figure 15:
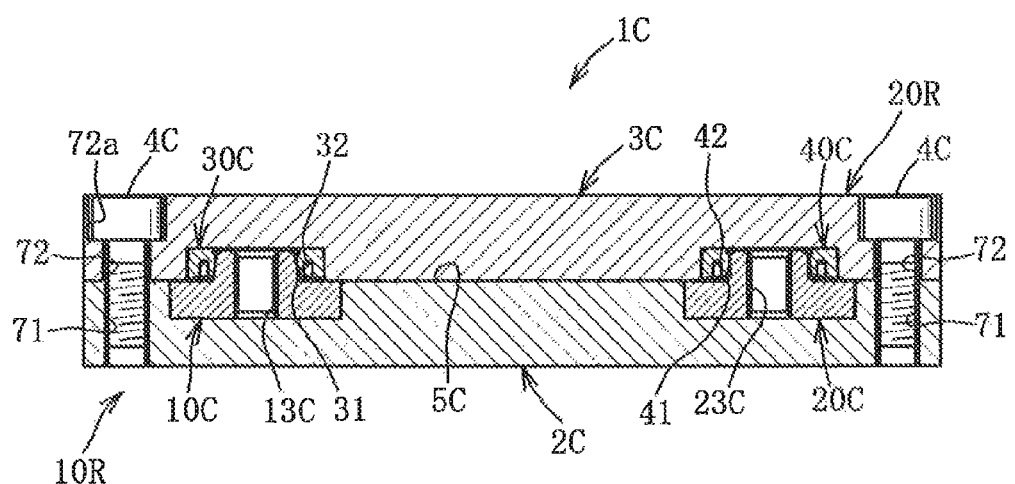
FIG. 15 is a vertical cross-sectional diagram of the pallet positioning/fixing device.

As shown in FIG. 14 and FIG. 15, the base member 2C comprises; a first reference member 10C for horizontal positioning, a second reference member 20C for rotational regulation around the axial center of the first reference member 10C in the horizontal plane and disposed in a position isolated from the first reference member 10C, the reference seat 5C, and the pair of bolt holes 71. The first and second reference members 10C, 20C are respectively disposed in positions proximate to both ends of the base member 2C. The pair of bolt holes 71 are formed at both ends of the base member 2C on the outer side than the first and second reference members 10C, 20C. Furthermore, if the base member 2C has a rectangular shape such as that of base member 2 of the first embodiment, or a square shape, the first and second reference members 10C, 20C are disposed to be the same as the positioning/fixing device 1 of embodiment 1.

Since the first reference member 10C, other than being provided with the vertical hole 13C formed in the center of the first reference member 10C in lieu of the bolt hole 13 of embodiment 1, has the same composition as the first reference member 10 of embodiment 1, the explanation of other compositions is omitted. Furthermore, the hole 13C may also be omitted.

Since the second reference member 20C, other than being provided with the vertical hole 23C formed in the center of the second reference member 20C in lieu of the bolt hole 23 of embodiment 1, has the same composition as the second reference member 20 of embodiment 1, the explanation of other compositions is omitted. Furthermore, the hole 23C may also be omitted.

Pallet 3C comprises; a first annular engagement member 30C which engages with the first reference member 10C, a second annular engagement member 40C which engages with the second reference member 20C, and two bolt pass through holes 72 corresponding to the bolt hole 71 of the base member 2C. On the upper part of the bolt pass through hole 72 is formed to be a head housing hole 72a which houses the bolt head of the clamp bolt 4C. In a state in which the clamp bolt 4C is fastened, the upper surface of the bolt head is positioned slightly lower than the upper surface of the pallet 3C. Furthermore, the first annular engagement member 30C and the second annular engagement member 40C have the same construction.

The pallet 3C is mounted on the reference seat 5C of the base member 20, and by respectively fastening the pair of clamp bolts 4C to the bolt holes 71 of the base member 20 from the bolt pass through holes 72, and by pressing the pallet 3C to the reference seat 5C, the pallet 3C is positioned and fixed by contacting tightly the annular engagement portions 31, 41 to the first and second tapered engagement surfaces 18, 28 through the elastic deformation of the annular engagement portions 31, 41.

When the annular engagements portions 31, 41 contact with the first and second tapered engagement surfaces 18, 28, the annular engagement member 40C can move slightly relative to the base member 2C in the lateral direction in FIG. 14 through the pair of shallow grooves 28a. However, the vertical movement in FIG. 14 via the pair of second tapered engagement surfaces 28 is not possible. Thereby, even if there is a manufacturing error between the distance between the axial centers of the first and second reference members 10C and 20C of the base member 2C and the distance between the axial centers of the first and second annular engagement members 30C, 40C of the pallet 3C, the pallet 3C can be positioned and fixed relative to the base member 2C through the first and second reference members 10C, 20C.

Furthermore, the first positioning/fixing mechanism 10R for horizontal positioning and fixing, is composed of the first reference member 10C, an annular engagement member 30C, the bolt 4C, and the bolt hole 71. The second positioning/fixing mechanism 20R for horizontal positioning and fixing is composed of the second reference member 20C, an annular engagement member 40C, the bolt 4C and the bolt hole 71.

The pallet positioning/fixing device 1C explained above basically presents the same action and advantages as the pallet positioning/fixing device of embodiment 1. Furthermore, the pair of bolt holes 71 are formed in the base member 2C on the outer part than the first and second reference members 10C, 20C, and since the pair of bolt pass through holes 72 are thrilled on parts of the pallet 3C corresponding to the pair of bolt holes 71, the construction of the first and second reference members 10C, 20C can be simplified.

Furthermore, a positioning and fixing composition may also be adopted in which a pair of annular engagement members 30C is disposed with a specified interval A therebetween in the pallet 3C, and, on the base member 2C, three or more first reference members 10C are provided in series with keeping the specified interval A, and a pair of annular engagement members 30C on the pallet 3B are engaged with adjacent two first reference members 10C selectively. In this ease, the position of the pallet 3C can be switched to multiple positions. With the pallet 3C, there are instances of composing in other than the thick plate form, such as in a cuboid shape. In addition, mechanisms for attaching/removing the cutting tools and various other mechanisms, may also be included on the pallet 3C.

Embodiment 5

Figure 16:
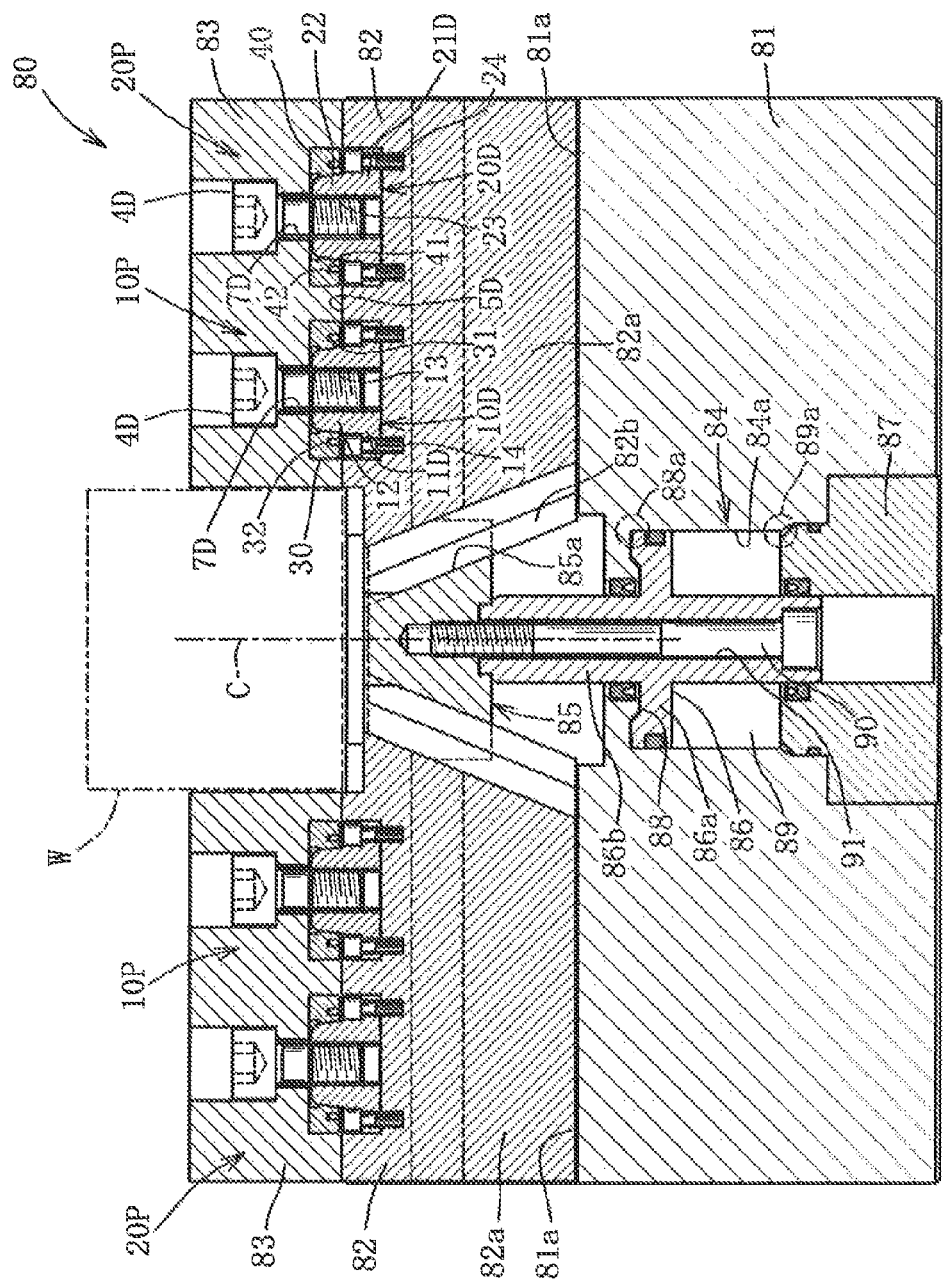
FIG. 16 is a vertical cross-sectional diagram of the vise device of the fifth embodiment.
Figure 17:
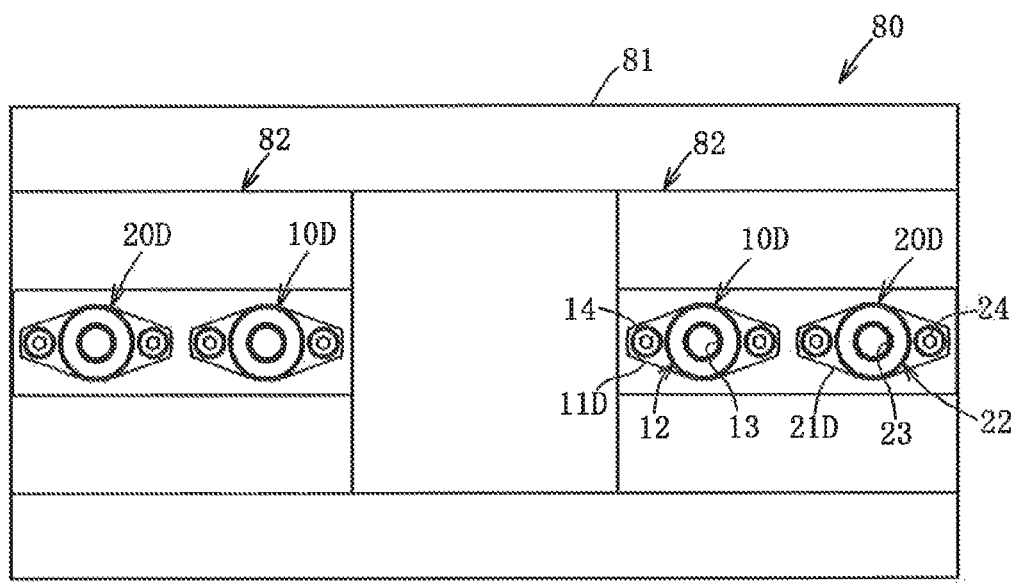
FIG. 17 is a plan view of the vise device of FIG. 16.

Next, an explanation will be made concerning the vise device 80 (corresponding to the "object positioning/fixing device"; hereafter referred to as "positioning/fixing device"), based on FIG. 16 and FIG, 17. The vise device 80 is a device for clamping the work to be supplied to the mechaning with the machine tool. Furthermore, the same elements as those of embodiment 1 are given the same numerals, and their explanation is omitted.

The vise device 80 comprises; a vise main body 81, a pair of movable members 82 (corresponding to the "base member"), a pair of claw members 83 (corresponding to the "target object") positioned and fixed to the movable member 82, a hydraulic cylinder 84 provided within the vise main body 81, and a driving member 85 attached to the front end of the output rod 86b of the piston member 86 of the hydraulic cylinder 84, and the like.

The vise device 80, in the same manner as with general vise devices, drives the pair of claw members 83 so as to close mutually and clamps the work W by means of the hydraulic cylinder 84. On the upper end of the vise main body 81 formed is a pair of T grooves 81a positioned on both sides of the driving member 85. A leg 82a of the movable member 82 is formed to he a leg having the cross-section of a cross shape slidably engaged in the T groove 81a.

The driving member 85 has a trapezoidal shape in front view, as shown in the drawing, and the lateral side surfaces are formed to be inclinations inclined approximately 20-30° relative to the vertical plane so as to mutually approach upwardly. The T groove 85a having a T shape cross section is formed at the end of each inclination. The inside end of each movable member 82 is formed to be inclination parallel with the opposing T grooves 85a, and each inclination has a T shape engagement which slidably engages with the corresponding T groove 85a.

The hydraulic cylinder 84 comprises; a vertical cylinder bore 84a, a piston member 86 which includes a piston 86a fitted in the cylinder bore 84a and an output rod 86h, a closure member 87 which closes the lower end of the cylinder bore 86a, a clamp oil chamber 88 formed above the piston 86a within the cylinder bore 84a and a unclamp oil chamber 89 formed below the piston 86a, and an oil passage 88a communicating with the clamp oil chamber 88 formed within the vise main body 81 and an oil passage 89a communicating with the unclamp oil chamber 89.

The oil passage 88a, 89a are connected to a pressurized oil supply device (not shown), to selectively supply pressurized oil to one of either the clamp oil chamber 88 or the unclamp oil chamber 89 from the pressurized oil supply device; and pressurized oil can be selectively extracted from the other of the clamp oil chamber 88 or the unclamp oil chamber 89. In the center of the piston member 86 formed is a bolt pass through hole 91 into which the bolt 90 is inserted, and the driving member 85 is fixed to the piston member 86 by the bolt 90 inserted into the bolt pass through hole 91.

Thus, when pressurized oil is supplied to the clamp oil chamber 88, and the pressurized oil is released from the unclamp oil chamber 89, the driving member 85 descends, and the pair of movable members 82 are driven for clamping to mutually approach through the T shaped grooves 85a and T shaped engagements 82b, enabling the work W to be clamped. Conversely, by supplying the pressurized oil to the unclamp chamber 89, and releasing the pressurized oil from the clamp oil chamber 88, the driving member 85 is raised, and the pair of movable members 82 are driven to unclamp so as to mutually separate through the T grooves 85a and the T shape engagements 82b.

Next, an explanation will be made concerning the mechanism for positioning and fixing the claw member 83 to the movable member 82. The pair of claw members 83 are symmetrically composed relative to the center line C of the hydraulic cylinder 84. Therefore, an explanation will be made concerning the mechanism for positioning and fixing the right side claw member 83 relative to the movable member 82. The movable member 82 comprises; a horizontal reference seat SD formed for vertically positioning the claw member 83, a first reference member 10D for horizontally positioning the claw member 83 relative to the movable member 82, and a second reference member 20D for regulating the rotation of the claw member 83 in the horizontal plane, around the axial center of the first reference member 10D.

The first and second reference members 10D, 20D comprise respectively; the flange portions 11D, 21D housed in the indentation formed in the movable member 82, and the engagement convex portions 12, 22 formed integrally with flange portions 11D, 21D and protruding upward than the upper surface of the movable member 82. The engagement convex portions 12, 22 are provided with the first and second tapered engagement surfaces (numerals are not shown) whose diameter decreases upwardly. The flange portions 11D, 21D are formed from a pair of trapezoidal extending portions extending to both sides of the engagement convex portions 12, 22, and the pair of extending portions are fixed to the movable member 82 by a pair of bolts 14, 24. In the center of the engagement convex portions 12, 22 formed are bolt holes 13, 23 into which clamp bolts 4D are screwed. Furthermore, the first and second tapered engagement surfaces are the same as the first and second tapered engagement surfaces 18, 28 of embodiment 1.

Annular engagement members 30,40 corresponding to the engagement convex portions 12, 22 of the first and second reference members 10D, 20D are press fit and fixed to claw member 83.

The annular engagement members 30,40 comprise; respectively, annular engagement portions 31,41 capable of deforming elastically so as to increase their diameter and capable of contacting with the first and second tapered engagement surfaces of the first and second reference members 10D, 20D, when the annular engagement members 30,40 are fastened the bolts 4D, and annular grooves 32,42 surrounding the outer periphery of annular engagement portions 31,41. In the claw 83 formed are bolt pass through holes 7D, 7D corresponding to the bolt holes 13, 23, and two thirds of the upper part of the bolt through holes 7D, 7D are firmed to be capable of housing the head of the clamp bolts 4D.

By respectively inserting a pair of clamp bolts 4D into the bolt pass through holes 7D, 7D, and fastening them to bolt holes 13, 23, the bottom surface of the claw member 83 contacts tightly against to the reference seat 5D, along with which the claw member 83 can be positioned and fixed with high precision through elastic deformation in the direction of diameter increase of the annular engagement portions 31, 41.

Furthermore, the first positioning/fixing mechanism 10P for accomplishing horizontal positioning and fixing is composed with a first reference member 10D, an annular engagement member 30 and a clamp bolt 4D. A second positioning f fixing mechanism 20P for regulating the rotation in the horizontal plane around the axial center of first positioning r fixing mechanism 10P and for positioning positioning horizontally. The first and second positioning/fixing mechanisms 10P, 20P are the same as the first and second positioning/fixing mechanisms 10P, 20P of embodiment 1.

In the vise device 80 explained above, work. W is clamped with using the pair of claw members 83 exchanged so as to correspond to the size or shape of the work W. At this time, if positioning errors of the claw member 83 increase relative to the movable member 82, then the clamping force acting on the work W becomes excessive or acts on the narrow section of the work W. Thereby, there is possibility of reducing the machining precision of the work W. However, in the vise device 80, since the claw member 83 can be positioned and fixed with high precision on the movable member 82, the clamping force acting on the work is stabilized, assuring the mechaning precision of the work W.

Embodiment 6

Figure 18:
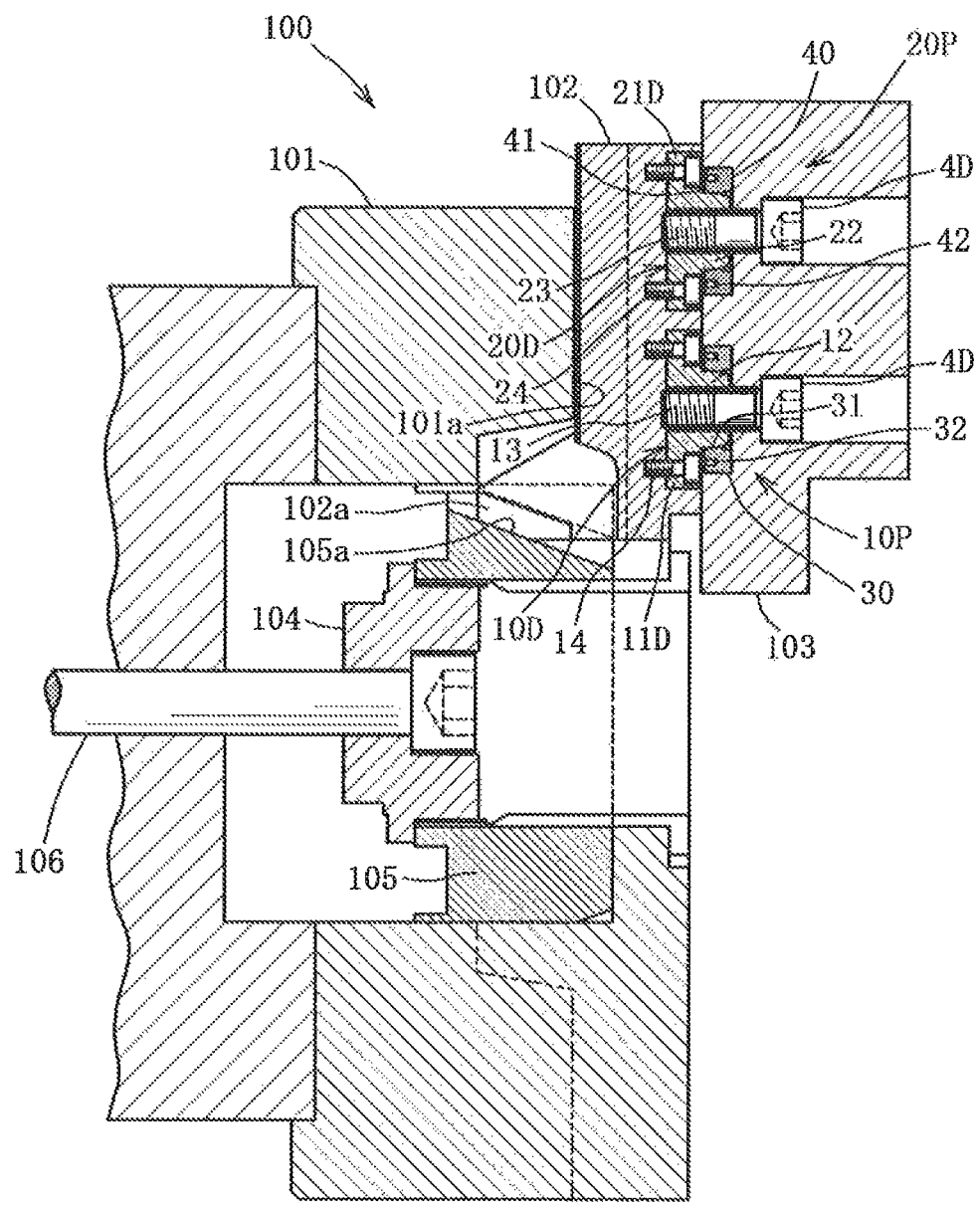
FIG. 18 is a vertical cross-sectional diagram of the chuck device of the sixth embodiment.
Figure 19:
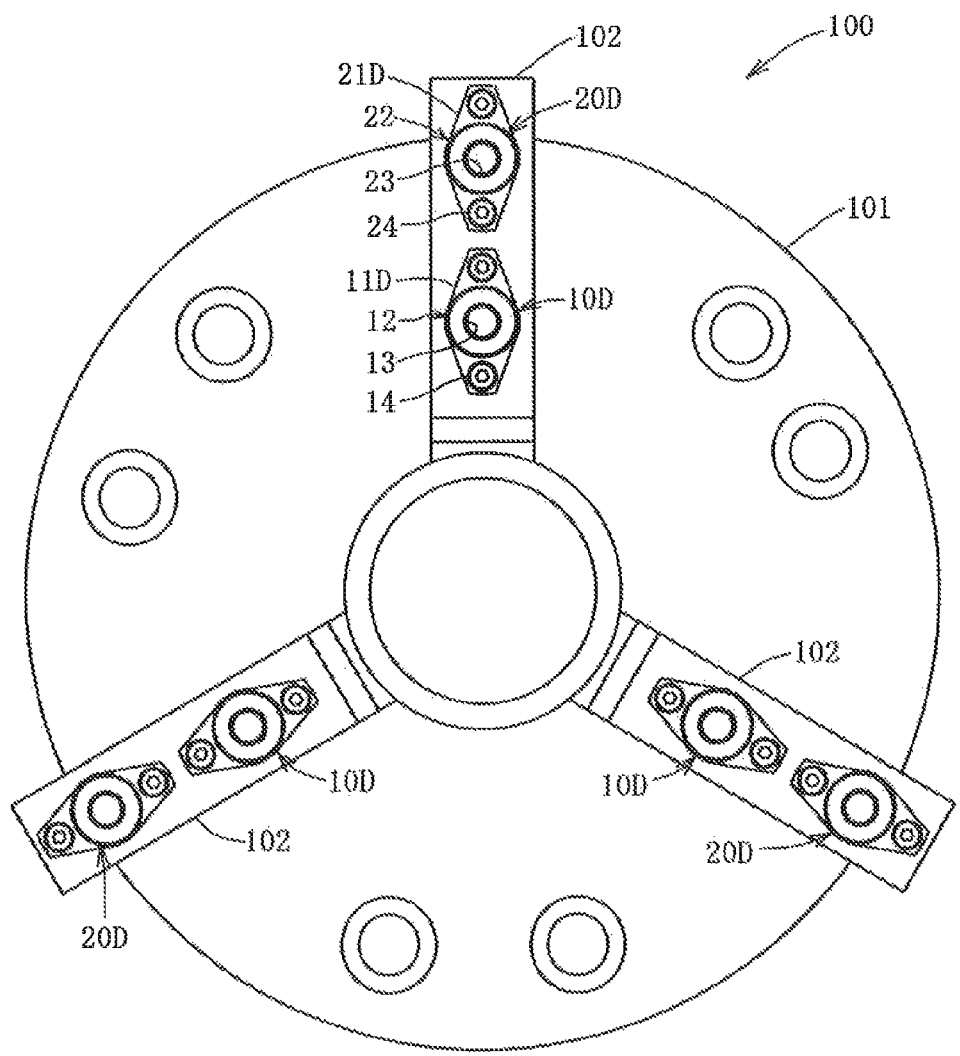
FIG. 19 is a front view of the chuck device of FIG. 18.

Next an explanation will be made concerning the chuck device 100 (corresponding to the "object positioning/fixing device", hereafter referred to as "positioning/fixing device") based on FIG. 18 and FIG. 19.

The chuck device 100 is a device provided at the front end of the main shaft of a lathe, and fixedly supports the work supplied for machining. The chuck device 100 comprises; a shaft front end member 101 composing the front end of the main shaft of the lathe, three movable members 102 (corresponding to the "base members") which are radially freely slidable on the front end of the shaft front end member 101, three claw members 103 (corresponding to the "target object") for respectively positioned and fixed to the three movable members 102, a driving member 104 fixed to the front end of the rod member 106, an annular member 105 which is screwed and externally fitted to the driving member 104 and a driving means (not shown) which drives the rod member 106 forward and backward.

On the periphery of the annular member 105 formed are inclined T grooves 105a corresponding to three movable members 102, and on the inside end of each movable member 102 formed is the T shaped engagement 102a which freely and slidably engages with the inclined T groove 105a. Three movable members 102 are composed to be radially drivable with the driving member 104 which is driven horizontally forward and backward through the rod member 106, by the driving means.

Furthermore, each movable member 102 is composed to be radially movable through a dove tail groove engagement which includes a dove tail groove 101a formed in the shaft front end member 101. The outer surface (surface facing on the claw member 10) of each movable member 102 abuts the inner surface (surface facing on the movable member 102) of the claw member 103, and is formed to be a reference seat for positioning the claw member 103 in the horizontal direction.

Since a composition other than a positioning and fixing mechanism which positions and fixes each claw member 103 to the movable member 102 is the same as a general chuck device, a detailed explanation thereof is omitted. Also, since first and second positioning fixing mechanisms 10P, 20P which position and fix the claw member 103 to the movable member 102 have the same construction as the first and second positioning fixing mechanisms 10P, 20P of embodiment 5, the same numerals are appended as those of embodiment 5, and an explanation thereof is omitted. Since the chuck device 100 presents the same advantages as the vise device 80 of embodiment 5, its explanation is omitted.

Additionally, in the present embodiment, the vertical direction parallel with the outer surface of the movable member 102 corresponds to the "horizontal direction" in the relation with Claims; and the direction perpendicular to the outer surface of the movable member 102 corresponds to the "vertical direction" in relation with Claims.

Embodiment 7

Figure 2:
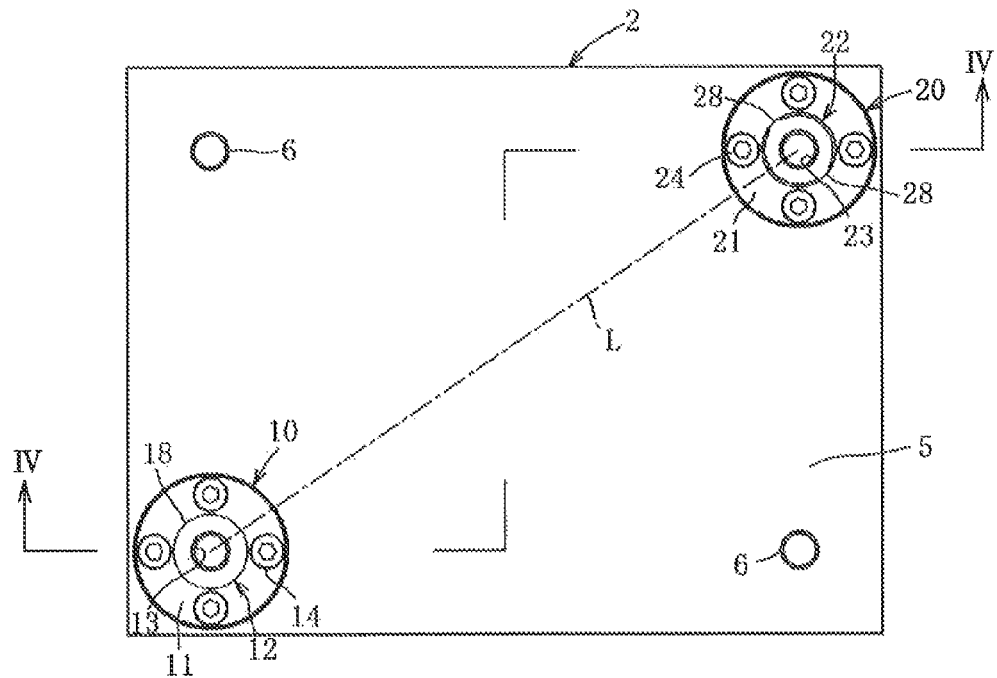
FIG. 2 is a plan view of the base member.
Figure 5:
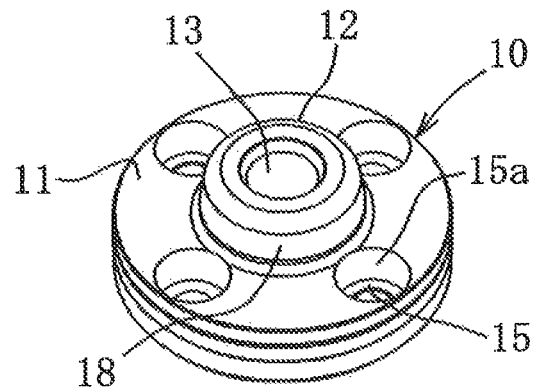
FIG. 5 is a perspective view of the first reference member.
Figure 6:
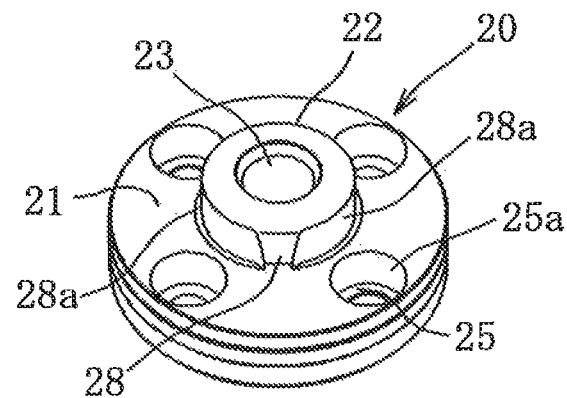
FIG. 6 is a perspective view of the second reference member.
Figure 20:
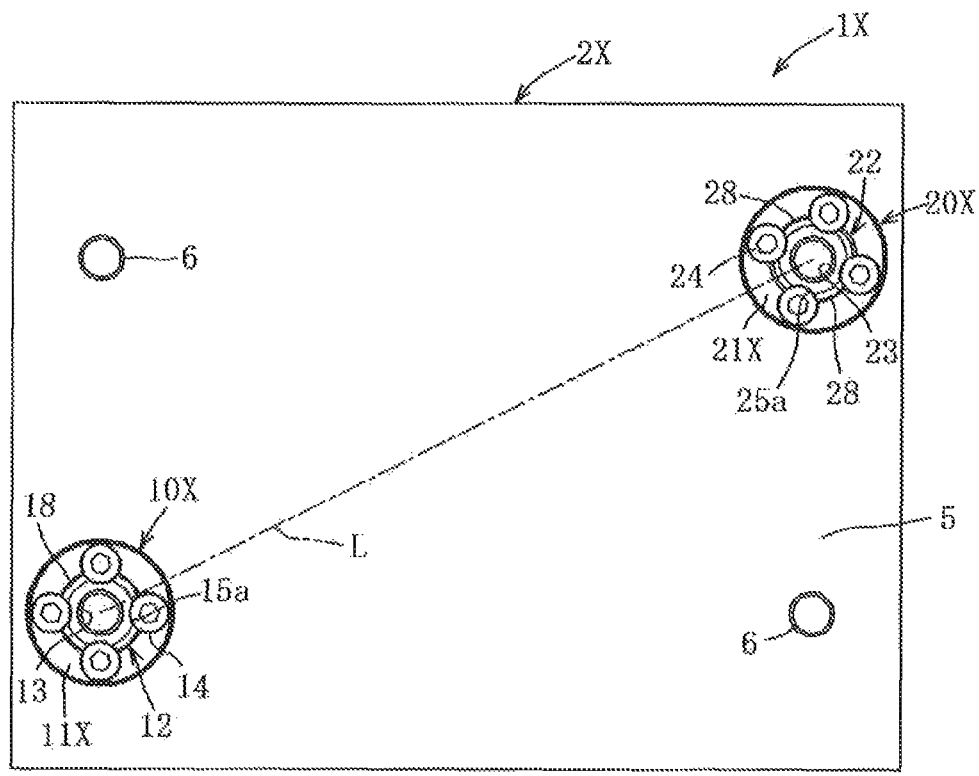
FIG. 20 is a plan view of the base member of the pallet positioning/fixing device of the seventh embodiment.
Figure 21:
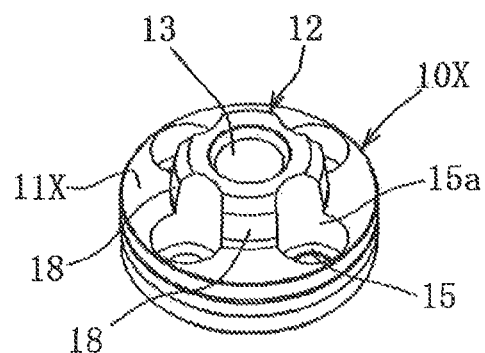
FIG. 21 is a perspective view of the first reference member of the seventh embodiment.
Figure 22:
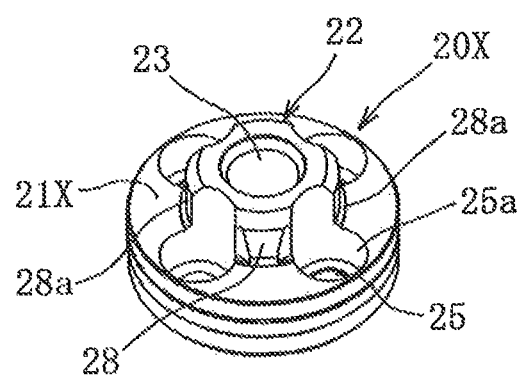
FIG. 22 is a perspective view of the second reference member of the seventh embodiment.

An explanation will be made concerning the pallet positioning/fixing device 1X, (corresponding to the "object positioning/fixing device") of embodiment 7 which partially changes the pallet positioning/fixing device of embodiment 1, based on FIG. 20 to FIG. 22. Also, the same numerals are appended with regard to compositions same as embodiment 1, and an explanation will be made only for compositions which are different from embodiment 1. FIG. 20 is a diagram corresponding to FIG. 2, FIG. 21 is a diagram corresponding to FIG. 5, and FIG. 22 is a diagram corresponding to FIG. 6.

In the pallet positioning/fixing device 1X, the flange portion 11X of the first reference member 10X is fixed to the base member 2X by four bolts 14. The bolt head housing hole 15a of the bolt hole 15 for fitting each bolt 14, in the plan view, is formed (see FIG. 20, FIG. 21) in a state which partially overlaps the tapered engagement convex portion 12.

Approximately a ⅓ portion of the diameter of the bolt head housing hole 15a, in the plan view, partially overlaps with the tapered engagement convex portion. The wall thickness of the wall between the external peripheral surface of the flange portion 11 and the bolt head housing hole 15a is extremely small. Thereby, the flange portion 11 can be given the smallest possible diameter, the first reference member 10X is miniaturized, and the production cost can be reduced.

On the outer circumference of the tapered engagement convex part 12, four tapered engagement surfaces 18 having a diameter decreasing upwardly and formed between the adjacent bolt head housing hole 15a, are formed in four positions dividing equally the circumstance. Each tapered engagement surface 18 has a circumferential length (arc length) of an approximate ⅛ circumference. Thereby, elastic deformation of the annular engagement portion (31) is promoted when elastically deforming toward the direction of increasing diameter, and enables an increase in the tight contact between the tapered engagement surface 18 and the annular engagement portion (31) of the first annular engagement member (30).

The flange portion 21X of the second reference member 20X is fixed to the base member 2X by four bolts 24. The bolt head housing hole 25a of the bolt hole 25 for inserting the bolt 24 is formed in a state in which, in the plan view, the bolt head housing hole 25a of the bolt hole 25 partially overlaps with the tapered engagement convex portion 22.

Approximately a ⅓ part of the diameter of the bolt head housing hole 25a, in the plan view, partially overlaps with the tapered engagement convex portion 22. The wall thickness of the wall between the outside peripheral surface of the flange portion 21X and the bolt head housing hole 25a is extremely small. Thereby, the flange 21X is given a small diameter, and the second reference member 20X is miniaturized, enabling a reduction in production cost.

On the outer circumference of the tapered engagement convex portion 22, two tapered engagement surfaces 28, whose diameters decrease upwardly, and which are formed between both of the adjacent bolt head housing holes 25a, are formed two positions dividing equally the circumference. The two tapered engagement surfaces 28, in FIG. 20, face in the direction perpendicular to the centerline L connecting the axial centers of the first and second reference members 10X, 20X. The circumferential length of each tapered engagement surface 28 is an approximate ⅛ circumference. Thereby, elastic deformation of the annular engagement portion (41) of the second annular engagement member (40) is promoted when elastically deforming toward increasing diameter, enabling an increase in the tight contact between the tapered engagement surface 28 and the annular engagement portion (41). Furthermore, the first and second reference members 10X, 20X can naturally be applied in the same manner to the first and second reference members of embodiments 2-7.

Next, an explanation will be made concerning an example of partially changing above described embodiments.

[1] As work pallets 3,3A, various constructions may be applied. For example, such a construction of the work pallet may be applicable, in which a angular tube member is erected on a flat plate member same as the work pallet 3, and multiple works may be fitted on multiple side surfaces of the angular tube member 1.

[2] The number of bolts 14 for fixing flange portion 11 of the first reference members 10, 10A-10C is not limited to four, but 2, 3, or 5 or more bolts may be used. The same can be said with respect to the second reference members 20, 20A-20C.

[3] Embodiment 5 has been explained, as an example of the vise device provided with the pair of claw members. However, it is also possible to apply the present invention to the chuck device having three claw members on the periphery in equal circumferential interval, and one skilled in the art would be able to execute and add various changes to above described embodiments without deviating from the spirit of the present invention.

INDUSTRIAL APPLICABILITY

The object positioning/fixing device according to the present invention, in the technology fields of work pallets, vise devices and chuck devices and the like, can be applied to various mechanisms for positioning and fixing target objects on the base member.

DESCRIPTION OF NUMERALS 1, 1A, 1B 1C pallet positioning/fixing device
2, 2A-2C base member
3, 3A work pallet
3C, 3D work pallet
4, 4B, 4C, 4D clamp bolt
5, 5B, 5C, 5D reference seat
6 bolt hole
7, 8 bolt pass through hole
10-10D, 10X first reference member
20-20D, 20X second reference member
11, 11D, 11X, 21, 21D, 21X flange portion
12, 22 engagement convex part
13, 23 bolt hole
13B, 23B pass through hole
14, 24 fitting bolt
15, 25 bolt hole
18, 28 first and second tapered engagement surface
30, 40 annular engagement member
31, 41 annular engagement portion
50 bolt hole forming member
60 seat forming member
54, 63 reference seat
70, 71 bolt bole
72 bolt pass through hole
80 vise device
82 movable member
83 claw member
100 chuck device
102 movable member
103 claw member

The invention claimed is:

1. An object positioning/fixing device which accomplishes horizontal and vertical positioning and fixing of a target object on a base member, wherein:

the base member comprises, a first reference member for horizontal positioning, a second reference member for regulating rotation around the first reference member in a horizontal plane and disposed in a position isolated from the first reference member, and a reference seat for vertical positioning, and wherein; the first and second reference members respectively comprise, a flange portion, and an engagement convex portion protruding upwardly from a center of the flange portion, said engagement convex portion of the first and second reference members respectively comprising a first and second tapered engagement surface whose diameter decreases upwardly, and wherein; the target object comprises multiple annular engagement members having respectively an annular engagement portion capable of deforming elastically so as to increase respective outer diameter and capable of respectively engaging tightly with the first and second tapered engagement surfaces of the first and second reference members, and wherein; said object positioning/fixing device is constituted so that, by mounting the target object on the reference seat of the base member, fastening multiple clamp bolts to multiple bolt holes on the base member side from multiple bolt pass through holes formed in the target object, and pressing the target object to the reference seat, the target object is positioned and fixed through an elastic deformation of the annular engagement portions.

2. The object positioning/fixing device according to claim 1 wherein; said bolt holes on the base member side are respectively formed in center portions of the first and second reference members, said bolt pass through holes formed in the target object are respectively formed in portions of the target object so as to correspond to said bolt holes, the target object is mounted on the reference seat of the base member, and said clamp bolts are respectively fastened to said bolt holes formed in the first and second reference members from said bolt pass through holes.

3. The object positioning/fixing device according to claim 1 wherein; multiple vertical center bolt pass through holes are respectively formed in a center portion of the first and second reference members, said bolt holes on the base member side are respectively formed in portions of the base member corresponding to said center bolt passthrough holes, said bolt pass through holes formed in the target object are respectively formed in portions of the target object corresponding to said center bolt pass through holes, and a pallet is mounted on the reference seat of the base member, and said clamp bolts are respectively fastened to said bolt holes on the base member side through said center bolt pass through holes of the first and second reference members from said bolt pass through holes.

4. The object positioning/fixing device according to claim 1 wherein: in a plane view, the second reference member, comprises a pair of tapered engagement surfaces facing each other in a perpendicular direction with a center line connecting both axial centers of the first and second reference members.

5. The object positioning/fixing device according to claim 1 wherein: on an upper surface of the base member formed is a reference seat for seating a lower surface of the target object.

6. The object positioning/ fixing device according to claim 1 wherein: said flange portions of the first and second reference members are fixed respectively by multiple fitting bolts in a state housed in multiple fitting holes formed in the base member, and said annular engagement members are press fit and fixed respectively into an indentation formed in the target object from a lower surface thereof.

* * * * *